W. N. Clark.

Door Check.

No. 1,399. Reissued Feb. 10, 1863.

Witnesses:
S. Bread
John B. Rankin

Inventor:
W. N. Clark
per Daniel Breed Atty

UNITED STATES PATENT OFFICE.

WILLIAM N. CLARK, OF CHESTER, CONNECTICUT.

IMPROVED ELASTIC DOOR-GUARD.

Specification forming part of Letters Patent No. 18,627, dated November 17, 1857; Reissue No. 1,399, dated February 10, 1863.

*To all whom it may concern:*

Be it known that I, WILLIAM NOYES CLARK, of Chester, in the county of Middlesex and State of Connecticut, have invented a new and Improved Elastic Guard for Doors, Walls, Partitions, Wall-Paper, Furniture, Counters, Door-Jambs, and all Similar Objects; and I do hereby declare that the following is a full and exact description thereof, reference being had to the accompanying drawings, and to the letters of reference marked thereon.

The chief object of my invention is to prevent injury to walls and partitions from the swinging of doors; but my guard is well adapted to protect walls from injury by various articles of furniture—as sofas, chairs, tables, bedsteads, and to all similar purposes. It also prevents noise from the slamming of doors or other objects in motion.

My invention consists of an elastic guard of india-rubber or other similar substance for protecting walls, partitions, doors, furniture, and similar objects. When held in place by a metallic escutcheon, consisting of a ring to be fastened to a door or wall or other smooth surface by means of screws or otherwise, so that the interior of the ring will form a shallow socket for receiving the base of said elastic guard, or said ring may be attached to a base-plate of metal corresponding in form with the base of the elastic guard, and may be fastened to the wall or door or other surface by a single screw projecting from its center and firmly attached to it; or, in lieu of said metallic escutcheon and as the equivalent thereof, a knob of wood or porcelain or other suitable material may be substituted with a cavity or shallow socket, cut, stamped, or molded therein, for receiving and holding said elastic guard as aforesaid, and may be fastened to the wall or door, &c., by means of a screw projecting from its base, as is common in bureau-knobs.

I do not limit myself to any precise form of the elastic guard, but I consider a hemispherical form best for ordinary purposes, and the recess or socket into which it is set must correspond in form with the base of the elastic guard and may flare slightly toward the bottom in order to hold the elastic guard more securely.

Figure 2:
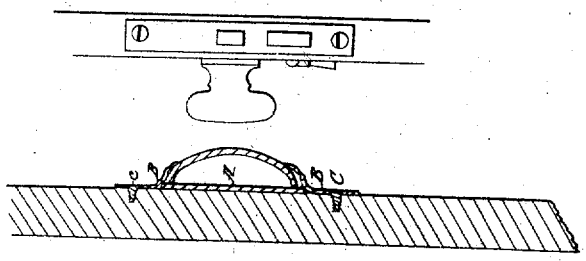
Figure 1:
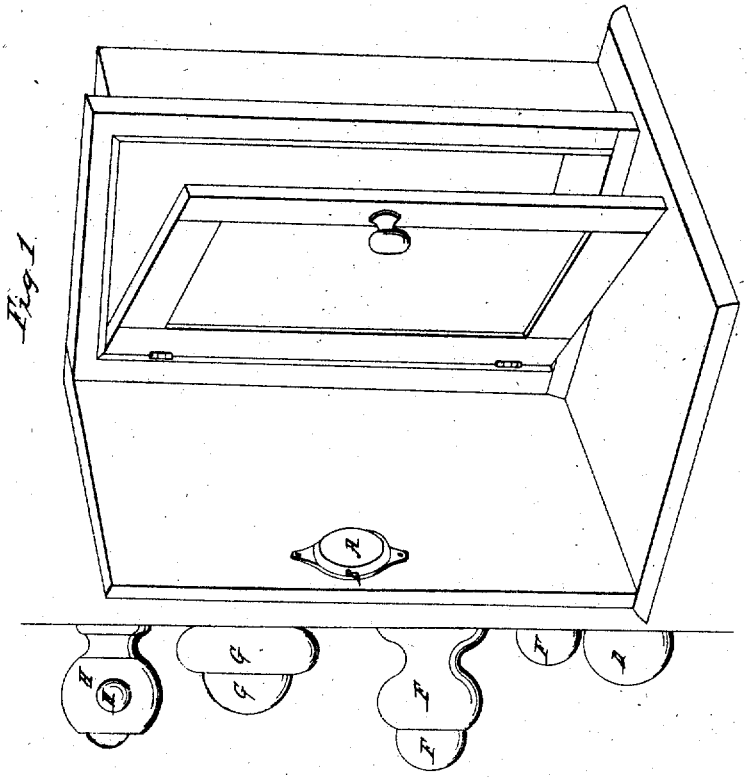

In the accompanying drawings, Figure 1 represents my invention applied to a wall for the purpose of guarding the same against injury from the door. Fig. 2 represents a portion of the door with the knob in position to swing against the guard, the latter being seen in section with a section of the escutcheon and wall. Fig. 3 represents modifications of the guard A as manufactured by me.

The accompanying drawings show very simple forms and applications of my elastic guard.

A is a hollow hemispherical piece of india-rubber embraced by a ring or escutcheon, B, which, by means of screws C, Fig. 2, fastens the rubber to the wall in such position that the ordinary door-knob D, Fig. 3, may strike the guard when the door swings quite open. The position of said guard or of the escutcheon or knob which holds it may be changed so long as it is made to serve the purpose above described of protecting walls, doors, and furniture, the guard being placed either upon the door, the door-jamb, the wall or partition, or upon sofas, tables, or other furniture or fixtures for the same ends. In Fig. 3 knobs F′, G′, and H′, made of wood, turned with a cavity in the end or side so as to receive and hold the rubber, are substituted for the metallic escutcheon. These knobs are each provided with a screw, so as to be inserted like a bureau-knob. The modification H H′ is intended to be placed upon the floor, the knob H′ being fastened like a bureau-knob, so that the rubber H may be struck by the door as it swings open. At F′ is seen a long knob, holding the guard F at a considerable distance from the point of fastening to the wall or other place where it is requisite to allow more space than is obtained by the short escutcheon G′.

The two guards D E are rubber, neatly covered with fibrous or textile stuff. They are provided with a screw at the base, like the wooden knobs above described. All of these are substantially the same as the original guard A, and serve the same purpose. The modes of fastening are suggested by the different positions of the guard and from convenience, and are the mere equivalents of the escutcheon. This guard may be cheaply manufactured and easily applied. It is very durable, and protects not only the walls and furniture, but also the door-knob, which is liable to break when coming violently in contact with the wall. It may be highly ornamented, presenting a beautiful finish, while it prevents the least noise or jar even when the door is opened or closed violently. Therefore, it is a desideratum.

I make no claim to the use of metallic spring door-guards, or to the general use of india-rubber for buffers, or to prevent jarring, but confine my claim to the particular improvement above described for the protection of walls, doors, and furniture.

Having thus fully described my invention, what I claim, and desire to secure by Letters Patent of the United States, is—

The above-described india-rubber or elastic-gum guard when held in place by the escutcheon or its equivalent, as herein described, for the purpose of protecting walls, doors, and furniture, substantially as set forth.

WILLIAM N. CLARK.

Witnesses:
JAMES L. LORD,
SOCRATES DENISON.